United States Patent
Jones et al.

(10) Patent No.: US 6,652,369 B2
(45) Date of Patent: Nov. 25, 2003

(54) FIXTURE FOR CLAMPING A GAS TURBINE COMPONENT AND ITS USE IN SHAPING THE GAS TURBINE COMPONENT

(75) Inventors: Daniel Edward Jones, Batavia, OH (US); Jacques Juneau, Jr., Amelia, OH (US)

(73) Assignee: General Electric Company, Schenectady, NY (US)

( * ) Notice: Subject to any disclaimer, the term of this patent is extended or adjusted under 35 U.S.C. 154(b) by 180 days.

(21) Appl. No.: 10/015,275

(22) Filed: Dec. 13, 2001

(65) Prior Publication Data

US 2003/0114082 A1 Jun. 19, 2003

(51) Int. Cl.[7] .................................................. B24B 7/00
(52) U.S. Cl. ......................... 451/365; 451/28; 451/49; 451/64; 451/364; 451/406; 269/238; 269/239
(58) Field of Search ............................. 451/28, 49, 64, 451/364, 365, 406; 269/238, 239

(56) References Cited

U.S. PATENT DOCUMENTS

| | | |
|---|---|---|
| 3,331,166 A | 7/1967 | Brenning |
| 3,818,646 A | 6/1974 | Peterson |
| 4,638,602 A | 1/1987 | Cavalieri |
| 4,805,351 A | 2/1989 | Dobson et al. |
| 4,829,720 A | 5/1989 | Cavalieri |
| 6,017,263 A | 1/2000 | Dwyer |
| 6,139,412 A | 10/2000 | Dwyer |
| 6,287,182 B1 | 9/2001 | Dwyer |
| 6,568,993 B1 * | 5/2003 | Jones et al. .................... 451/28 |

* cited by examiner

*Primary Examiner*—George Nguyen
*Assistant Examiner*—Shantese McDonald
(74) *Attorney, Agent, or Firm*—Gregory Garmong; Carmen Santa Maria; McNees Wallace & Nurick LLC

(57) ABSTRACT

A gas turbine component such as a turbine blade is clamped into a fixture having a base upon which a remainder of the fixture is supported, a stop which limits the movement of the gas turbine component, and two clamp arms affixed to the base and controllably clamping against the lower side of the platform of the gas turbine component to force the gas turbine component against the stop. When the gas turbine component is clamped in this position, its root may be readily shaped as by grinding.

19 Claims, 4 Drawing Sheets

FIXTURE FOR CLAMPING A GAS TURBINE COMPONENT AND ITS USE IN SHAPING THE GAS TURBINE COMPONENT

This invention relates to fixturing to support a gas turbine component, and more specifically, to clamping the gas turbine component in the fixture and shaping the root of the gas turbine component.

BACKGROUND OF THE INVENTION

In the most commonly practiced approach, turbine blades for gas turbine engines are cast to approximately the final shape. Then portions of the turbine blade, such as the root and the shroud, if any, are shaped to the final desired form by a technique such as grinding. The turbine blade is thereafter processed by depositing protective coatings or by other procedures.

The finished turbine blades are assembled into a turbine disk or wheel, with a "dovetail" form on the root of each turbine blade engaging a respective conformably shaped slot on the turbine disk. The turbine disk is in turn supported on a shaft in the gas turbine engine. The turbine blades must have precisely established positions and angular orientations in the turbine disk. Any mispositioning and misorientation may lead to aerodynamic inefficiency and the introduction of unacceptable vibrations in the turbine disk and the turbine blade as the turbine disk turns during service.

Because it is the root of each turbine blade that engages the slot on the turbine disk, the root must be shaped very precisely. Two techniques have been widely used to hold the turbine blade in an exact location and orientation for the shaping of the root. In one, the airfoil of the turbine blade is cast into a matrix of a metal with a low melting point, which is used to hold the turbine blade with its root positioned for grinding or other shaping. This approach, while operable, requires that the low-melting-point metal be cleaned from the surface of the airfoil after the shaping of the root is completed. Even traces of the metal remaining after careful cleaning of the surface of the airfoil may adversely affect the subsequent application of the coatings. Mechanical fixtures or jigs have been developed to hold the turbine blade. These fixtures avoid the use of the low-melting-point metal, but have not been fully satisfactory because they misposition the root or because they do not hold the turbine blades sufficiently repeatably and securely so that each root is shaped the same.

There is a need for an improved approach to the shaping of the roots of turbine blades and other gas turbine components. The present invention fulfills this need, and further provides related advantages.

SUMMARY OF THE INVENTION

The present invention provides a fixture for holding a gas turbine component in a specific fixed position for the shaping of the gas turbine component, and a method for performing the shaping. The approach does not use a molten metal whose complete removal is difficult. The fixture holds the gas turbine component using features of the gas turbine component that have been previously precisely established. This approach allows the gas turbine components to be processed precisely, quickly, reproducibly, without contamination, and with minimal dependence upon operator skill.

A fixture is provided for clamping a gas turbine component, such as a turbine blade, a compressor blade, or in some cases a vane, having a root separated from an airfoil by a transversely extending platform having an upper side adjoining the airfoil and a lower side adjoining the root, and a tang at an end of the root remote from the platform and the airfoil. The fixture comprises a base upon which the remainder of the fixture is supported, and a stop which prevents the gas turbine component from moving past a stop limit when the gas turbine component is forced in a clamping direction extending between the root and the airfoil. Two clamp arms are provided, including a first clamp arm on a leading-edge side of the gas turbine component with a first clamp surface facing the gas turbine component, and a second clamp arm on a trailing-edge side of the gas turbine component with a second clamp surface facing the gas turbine component. Each clamp arm is movable, preferably by a pivoting movement on the base, between a released position in which its clamp surface does not contact the platform and a clamped position in which its clamp surface contacts the platform and forces the gas turbine component in the clamping direction and against the stop. A clamping force source, preferably in the form of an hydraulic cylinder, controllably moves each of the clamp arms between the released position and the clamped position.

In the preferred embodiment, a pressure surface on each side of the root of the gas turbine component engages a respective shoulder of the fixture that defines the stop. In the normal practice, the pressure surfaces have been previously precisely shaped in reference to the remainder of the gas turbine component. Shaping the balance of the gas turbine component, specifically the lower end or tang of the gas turbine component, in reference to the pressure surfaces ensures that the entire root will be properly shaped and have the pressure surfaces and root mutually shaped for proper orientation of the airfoil.

The clamp surfaces of the clamp arms are desirably shaped to be conformable to a portion of the platform that is contacted by the clamp surface when the clamp arm is in the clamped position. This conforming shape maximizes the uniformity of the transfer of the clamping force into the gas turbine component and the security and stability of the clamping, with minimal risk of damage to the underside of the platform.

A method for shaping a gas turbine component comprises the steps of furnishing a gas turbine component, such as a turbine blade, having a root separated from an airfoil by a transversely extending platform having an upper side adjoining the airfoil and a lower side adjoining the root, and a tang at an end of the root remote from the platform. A fixture as described previously, in its basic or modified forms, is furnished. The gas turbine component is clamped in the fixture, and thereafter the root of the gas turbine component is shaped while the gas turbine component is clamped in the fixture. Preferably, the tang portion of the root, and/or an end surface of the root, is shaped by grinding.

The present approach provides a convenient, secure fixturing approach which avoids the use of molten metal and also ensures that the gas turbine component is properly positioned for shaping of the root, particularly the tang of the root.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
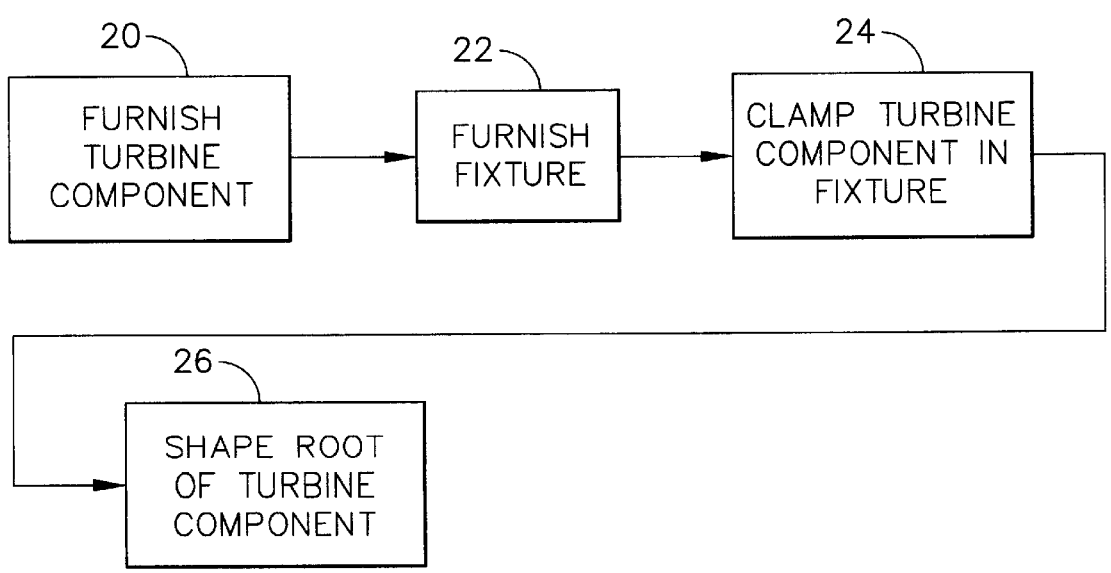
FIG. 1 is a block flow diagram of an approach for practicing the invention.
Figure 2:
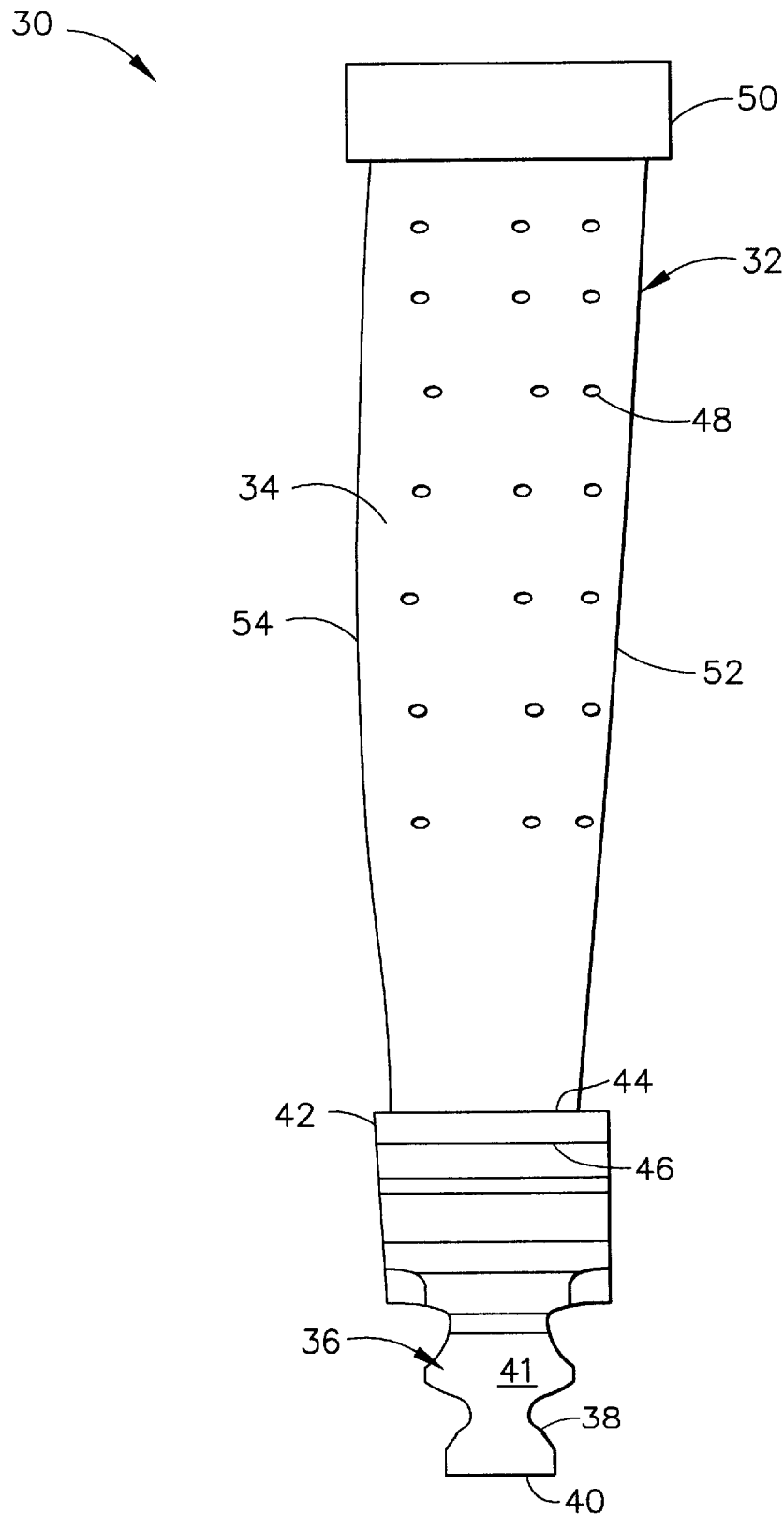
FIG. 2 is an elevational view of a turbine blade.

FIG. 1 depicts a method for shaping a gas turbine component. A gas turbine component is furnished, numeral 20. FIG. 2 illustrates such a gas turbine component 30, in the preferred case a turbine blade 32. Other types of turbine component, such as compressor blades and, in some cases, compressor or turbine vanes, may be utilized with the present invention. The turbine blade 32 is formed of any operable material but is preferably a nickel-base superalloy or a cobalt-base superalloy. The turbine blade 32 includes an airfoil 34 against which the flow of hot exhaust gas is directed. The turbine blade 32 is mounted to a turbine disk (not shown) by a root 36 which extends downwardly from the airfoil 34 and engages a slot on the turbine disk. The root 36 has the form of a dovetail, with pressure surfaces 38 on either side, a tang 40 at the end of the root 36 most remote from the airfoil 34 and the platform, and a pair of end surfaces 41 that face upwardly out of the plane of the page in FIG. 1 and downwardly out of the plane of the page. A platform 42 extends transversely outwardly from the area where the airfoil 34 is joined to the root 36. The platform has an upper side 44 adjoining the airfoil 34 and a lower side 46 adjoining the root 36. Optionally, a number of internal passages extend through the interior of the airfoil 34, ending in openings 48 in the surface of the airfoil 34. During service, a flow of cooling air is directed through the internal passages and out the openings 48 to reduce the temperature of the airfoil 34. A rotating shroud 50 is at the tip of the airfoil 34 remote from the root 36. The airfoil 34 may be described as having a leading edge 52 and a trailing edge 54.

Figure 3:
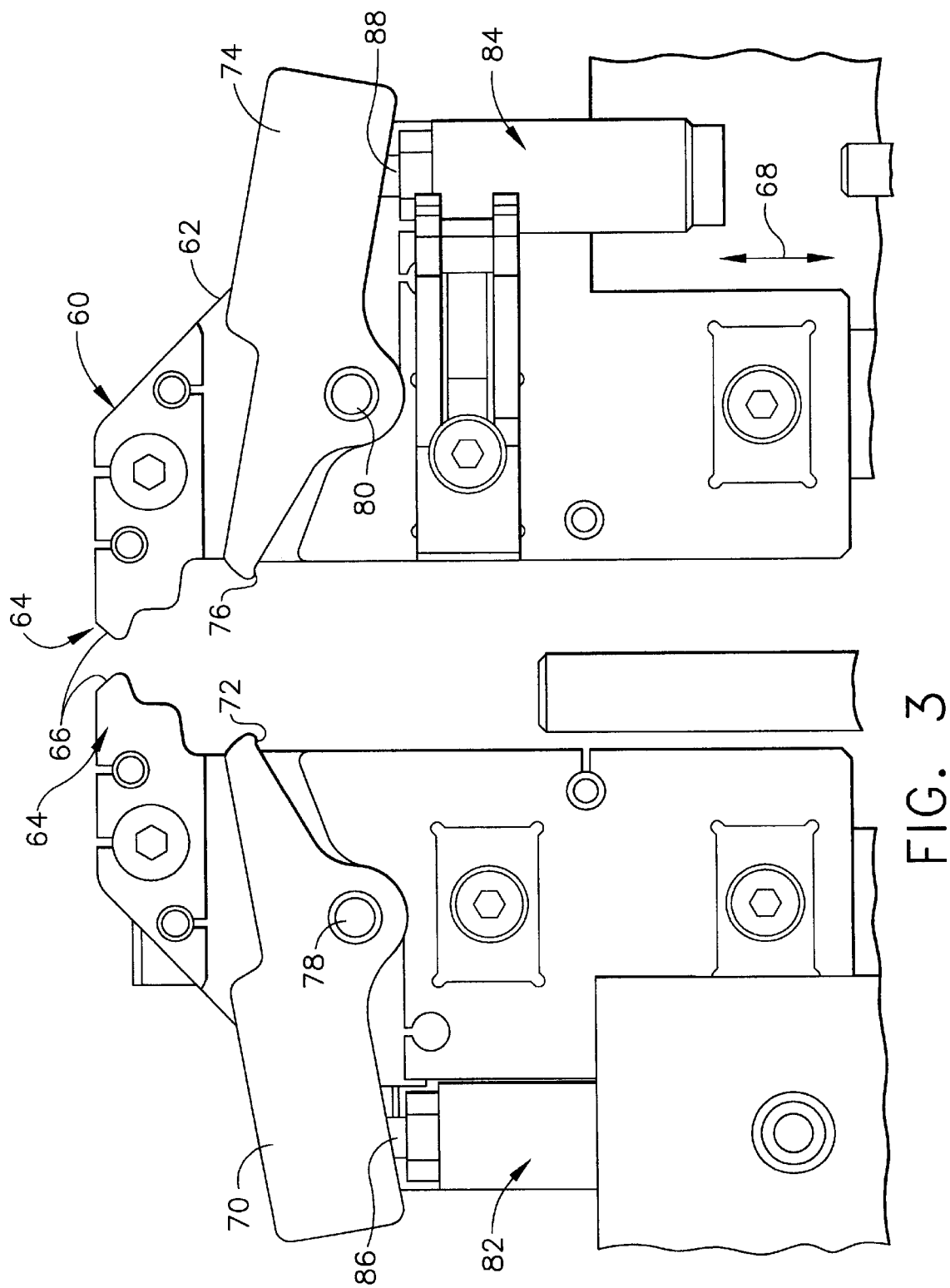
FIG. 3 is a plan view of a fixture in which the turbine blade is held for grinding, with the clamp arms in the released position and without a turbine blade present.
Figure 4:
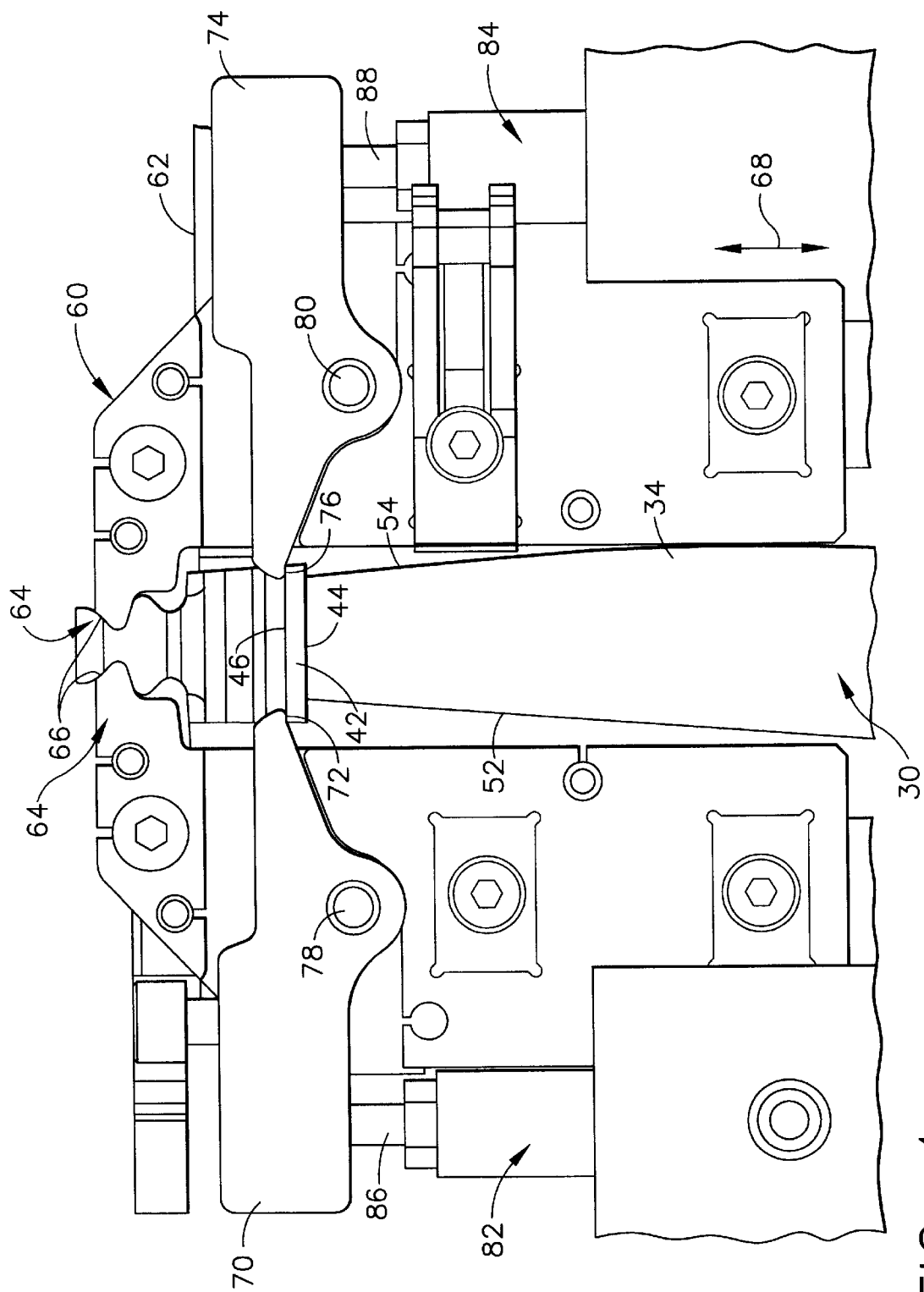
FIG. 4 is a plan view of the fixture and turbine blade of FIG. 3, with a turbine blade present and with the clamp arms in the clamped position against the platform of the turbine blade.

A fixture 60 to hold the gas turbine component 30 is provided, numeral 22 of FIG. 1. FIGS. 3–4 illustrate a preferred form of the fixture 60. The fixture 60 includes a base 62 upon which the remainder of the fixture is supported. A stop 64, preferably in the form of two shoulders 66 which engage the pressure surfaces 38 of the root 36, prevents the gas turbine component 30 from moving past a stop limit when the gas turbine component 30 is forced in a clamping direction 68 extending from the root 36 toward the airfoil 34. (The clamping direction 68 may be reversed to extend from the airfoil 34 toward the root 36 by reversing the positions of the stop 64 and the clamp arms discussed next. The embodiment illustrated in FIGS. 3–4, in which the clamping direction extends from the airfoil 34 toward the root 36, is preferred and will be discussed.)

The fixture 60 includes two clamp arms, which are similar in structure except for the direction they face and possibly the shape of the clamp surfaces. A first clamp arm 70 is on a leading-edge 52 side (see FIG. 4) of the gas turbine component 30. A first clamp surface 72 of the first clamp arm 70 faces the gas turbine component 30. A second clamp arm 74 is on a trailing-edge 54 side (see FIG. 4) of the gas turbine component 30. A second clamp surface 76 of the second clamp arm 74 faces the gas turbine component 30.

Each clamp arm 70, 74 is movable between a released position, illustrated in FIG. 3, in which its respective clamp surfaces 72, 76 do not contact the platform 42, and a clamped position, illustrated in FIG. 4, in which its respective clamp surface 72, 76 contacts the lower side 46 of the platform 42. (In the alternative embodiment, the respective clamp surfaces 72, 76 contact the upper side 44 of the platform 42.) Preferably, each clamp arm 70, 74 is pivotably connected to the base 62 by a respective pivot pin 78, 80, so that the clamp arms 70, 74 may pivot between the released position and the clamped position. When the clamp arms 70, 74 are in the clamped position of FIG. 4, they together force the gas turbine component 30 in the clamping direction 68 so that the gas turbine component 30 is clamped against the stop 64. Specifically, in the illustrated preferred case illustrated in FIG. 4, the turbine blade 32 is forced downwardly by the clamping pressure against the lower side 46 of the platform 42, so that the pressure surface 38 of the root 36 is forced against the shoulder 66 of the stop 64. (The turbine blade 32 in the fixture in FIG. 4 is inverted relative to the illustration of FIG. 2.)

Each clamp arm 70, 74 is provided with a respective clamping force source 82, 84 that controllably moves the respective clamp arm 70, 74 between the released position of FIG. 3 and the clamped position of FIG. 4. Each clamping force source 82, 84 may be of any operable type. Conveniently, the clamping force sources 82 and 84 each comprise a respective hydraulic (operating with any operable liquid or gaseous medium, but preferably a liquid medium to achieve large clamping forces) cylinder 86, 88 that operate in tandem to move the respective clamp arms 70, 74. That is, the clamping force sources 82 and 84 move both of the respective clamp arms 70 and 74 to the released position or to the clamped position in tandem, so that the gas turbine component 30 is symmetrically clamped on the leading-edge 52 side and the trailing-edge 54 side (but not to the leading edge or to the trailing edge).

The lower side 46 of the platform 42 may be flat, or it may be curved. Preferably, each clamp surface 72, 76 is conformably shaped to a portion of the lower side 46 of the platform 42 that is contacted by the respective clamp surface 72, 76 when the respective clamp arm 70, 74 is in the clamped position of FIG. 4. The shapes of the two clamp surfaces 72 and 76 may be different, according to whether the shapes of the respective contracted portions of the lower side 46 of the platform 42 are different, or they may be the same. This conforming shaping of the clamp surfaces 72, 76 to the contacted portions of the lower side 46 of the platform 42 aids in assuring a non-slipping, secure, precisely positioned clamping of the gas turbine component 30 in the fixture 60.

Returning to FIG. 1, the gas turbine component 30 is inserted into the fixture 60 when the clamp arms 70, 74 are in the released position of FIG. 3, so that there is sufficient clearance and room to insert the gas turbine component 30. In normal use, the base 62 lies in a vertical plane, so that the clamping direction 68 is approximately vertical. The gas turbine component 30 is loaded into the fixture 60 so that one of its end surfaces 41 contacts the base 62. The gas turbine component 30 initially hangs from the shoulders 66, and then is securely clamped into position by the clamp arms 70 and 74. The gas turbine component 30 is clamped into the fixture 60, numeral 24, by moving the clamp arms 70, 74 to the clamped position of FIG. 4. With the described fixture, it was found that the gas turbine component 30 readily and automatically self centers within the fixture 60 as the clamping action occurs, avoiding any effect of a slight amount of operator misplacement when the gas turbine component 30 is inserted into the fixture 60.

The root 36, and specifically the tang 40 and/or the end surfaces 41 of the root 36, is shaped, numeral 26. The shaping 26 is accomplished by any operable approach, but preferably grinding using a creep feed grinder and grinding technique is used. The creep feed grinder takes relatively large bites of material with each pass, typically on the order of 0.20 inches per pass, and the grinding tool moves rapidly with respect to the root 36, typically on the order of 45 inches per minute. The forces transmitted to the root 36 and thence to the gas turbine component 30, and the vibrations potentially introduced into the gas turbine component 30, by the creep feed grinder are relatively large. The root 36 must therefore be clamped very securely by the fixture 60, and the present fixture 60 provides that secure support and clamping of the gas turbine component 30.

The clamping of the gas turbine component 30 using the illustrated fixture 60 generates the clamping force between the lower side 46 of the platform 42 and the pressure surface 38 of the root 36. (Or, in the alternative and less-preferred embodiment, the clamping force is generated between the upper side 44 of the platform 42 and another portion of the pressure surface 38 of the root 36.) In the preferred practice of the present approach, the pressure surface 38 would have been previously shaped using another fixture, so that it is precisely shaped, positioned, and oriented relative to the remainder of the gas turbine component 30, as required. Using the precisely shaped pressure surface 38 as the datum for positionally and angularly aligning the tang 40 (and/or the end surfaces 41) results in the tang 40 (and/or the end surfaces 41) being precisely machined relative to the pressure surface 38 of the root 36. This two-step shaping of first the pressure surface 38 and then the tang 40 results in the pressure surface and the tang 40 (and/or the end surfaces 41) being precisely positioned relative to each other, which is important for the holding of the gas turbine component 30 in its slot in the turbine disk, and relative to the airfoil 34 and shroud 50, which is important for positioning the airfoil 34 precisely in the gas flow path of the gas turbine engine.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A fixture for clamping a gas turbine component having a root separated from an airfoil by a transversely extending platform having an upper side adjoining the airfoil and a lower side adjoining the root, and a tang at an end of the root remote from the platform, the fixture comprising
    a base upon which a remainder of the fixture is supported;
    a stop which prevents the gas turbine component from moving past a stop limit when the gas turbine component is forced in a clamping direction extending between the root and the airfoil;
    two clamp arms, a first clamp arm being on a leading-edge side of the gas turbine component with a first clamp surface facing the gas turbine component, and a second clamp arm being on a trailing-edge side of the gas turbine component with a second clamp surface facing the gas turbine component, each clamp arm being movable between a released position in which its clamp surface does not contact the platform and a clamped position in which its clamp surface contacts the platform and forces the gas turbine component in the clamping direction and against the stop; and
    a clamping force source that controllably moves each of the clamp arms between the released position and the clamped position.

2. The fixture of claim 1, wherein the gas turbine component is a turbine blade.

3. The fixture of claim 1, wherein a pressure surface on each side of the root of the gas turbine component engages the stop.

4. The fixture of claim 1, wherein the stop comprises a shoulder.

5. The fixture of claim 1, wherein each clamp surface is conformably shaped to a portion of the platform that is contacted by the clamp surface when the clamp arm is in the clamped position.

6. The fixture of claim 1, wherein the clamping force source comprises an hydraulic cylinder.

7. The fixture of claim 1, wherein the clamp arms are each pivotably affixed to the base.

8. The fixture of claim 1, wherein the clamping direction extends from the root toward the airfoil, and wherein the clamp surfaces of the clamp arms contact the lower side of the platform when the clamp arms are in the clamped position.

9. A fixture for clamping a turbine blade having a root separated from an airfoil by a transversely extending platform having an upper side adjoining the airfoil and a lower side adjoining the root, and a tang at an end of the root remote from the platform, the fixture comprising
    a base upon which a remainder of the fixture is supported;
    two stop shoulders which engage respective pressure surfaces on each side of the root of the turbine blade and prevent the turbine blade from moving past a stop limit when the turbine blade is forced in a clamping direction extending from the root toward the airfoil;
    two clamp arms pivotably affixed to the base, a first clamp arm being on a leading-edge side of the turbine blade with a first clamp surface facing the turbine blade, and a second clamp arm being on a trailing-edge side of the turbine blade with a second clamp surface facing the turbine blade, each clamp arm being pivotable between a released position in which its clamp surface does not contact the platform and a clamped position in which its clamp surface contacts the lower side of the platform and forces the turbine blade in the clamping direction and against one of the stop shoulders; and
    a pair of hydraulic cylinders, one of the hydraulic cylinders controllably moving each of the clamp arms between the released position and the clamped position.

10. The fixture of claim 9, wherein each clamp surface is conformably shaped to a portion of the lower side of the platform that is contacted by the clamp surface when the clamp arm is in the clamped position.

11. A method for shaping a gas turbine component, comprising the steps of
    furnishing a gas turbine component having a root separated from an airfoil by a transversely extending platform having an upper side adjoining the airfoil and a lower side adjoining the root, and a tang at an end of the root remote from the platform;
    furnishing a fixture comprising
        a base upon which a remainder of the fixture 60 is supported,
        a stop which prevents the gas turbine component from moving past a stop limit when the gas turbine component is forced in a clamping direction extending from the root toward the airfoil, two clamp arms, a first clamp arm being on a leading-edge side of the gas turbine component with a first clamp surface facing the gas turbine component, and a second clamp arm being on a trailing-edge side of the gas turbine component with a second clamp surface facing the gas turbine component, each clamp arm being movable between a released position in which its clamp surface does not contact the platform and a clamped position in which its clamp surface contacts the platform and forces the gas turbine component in the clamping direction and against the stop, and a clamping force source that controllably moves each of the clamp arms between the released position and the clamped position;

clamping the gas turbine component in the fixture; and thereafter shaping the root of the gas turbine component while the gas turbine component is clamped into the fixture.

12. The method of claim 11, wherein the step of shaping includes the step of grinding the root of the gas turbine component.

13. The method of claim 11, wherein the step of shaping includes the step of shaping the tang of the gas turbine component.

14. The method of claim 11, wherein the step of furnishing the gas turbine component includes the step of furnishing a turbine blade.

15. The method of claim 11, wherein the step of clamping includes the step of engaging a pressure surface on each side of the root of the gas turbine component against the stop.

16. The method of claim 11, wherein the step of furnishing the fixture includes the step of furnishing the stop comprising a shoulder.

17. The method of claim 11, wherein the step of furnishing the fixture includes the step of furnishing each clamp surface to be conformably shaped to a portion of the platform that is contacted by the clamp surface when the clamp arm is in the clamped position.

18. The method of claim 11, wherein the step of furnishing the fixture includes the step of furnishing the clamping force source comprising an hydraulic cylinder.

19. The method of claim 11, wherein the step of furnishing the fixture includes the step of furnishing the clamp arms that are each pivotably affixed to the base.

* * * * *